April 5, 1949.  C. J. JENDRESEN  2,466,431
HYDRAULIC TRANSMISSION
Filed Jan. 27, 1945  4 Sheets-Sheet 1

INVENTOR.
CARL J. JENDRESEN
BY Lester B. Clark
& Ray L. Smith
ATTORNEYS

INVENTOR.
CARL J. JENDRESEN

April 5, 1949.    C. J. JENDRESEN    2,466,431
HYDRAULIC TRANSMISSION

Filed Jan. 27, 1945    4 Sheets-Sheet 3

INVENTOR.
CARL J. JENDRESEN
BY Lester B. Clark
 Ray L. Smith
ATTORNEYS

April 5, 1949.   C. J. JENDRESEN   2,466,431
HYDRAULIC TRANSMISSION

Filed Jan. 27, 1945   4 Sheets-Sheet 4

INVENTOR.
CARL J. JENDRESEN
BY Lester B. Clark
& Ray L. Smith
ATTORNEYS

Patented Apr. 5, 1949

2,466,431

UNITED STATES PATENT OFFICE 2,466,431

HYDRAULIC TRANSMISSION

Carl J. Jendresen, Mission, Tex.

Application January 27, 1945, Serial No. 574,928

5 Claims. (Cl. 192—58)

This invention relates to a torque transmitting device, and more particularly to a device of this type which is capable of transmitting torque from a drive member to a driven member throughout wide ranges of torques and driving ratios.

The primary object of the invention is to provide a device of the class described which is simple in construction and which is readily adaptable for use throughout a wide range of requirements and conditions.

Another object is to provide a fluid transmission which includes nested drive and driven members forming an enclosure within which fluid moves outwardly under centrifugal force to effect a driving connection between the members.

It is also an object to provide a fluid transmission in which a plurality of immiscible liquids of different specific gravities and/or viscosities may be utilized in a manner to satisfy numerous operating requirements.

A still further object is to provide a transmission in which the torque transmitting fluid is admitted to the torque transmitting vanes in a manner that is controlled by the speed of the mechanism.

A still further object is to provide a fluid transmission which includes temperature control means for increasing or decreasing the temperature of the mechanism and the fluid contained therein, as necessary to maintain desired viscosities of the transmission fluid or fluids.

A still further object is to provide a fluid transmission including means for effecting a positive interlock between the drive and driven members.

Another object is to provide a fluid transmission in which no fluid seal is required between relatively movable parts thereof.

The foregoing objects, together with additional objects, will be more fully apparent from the following description considered in connection with the accompanying drawings, in which.

Figure 1:
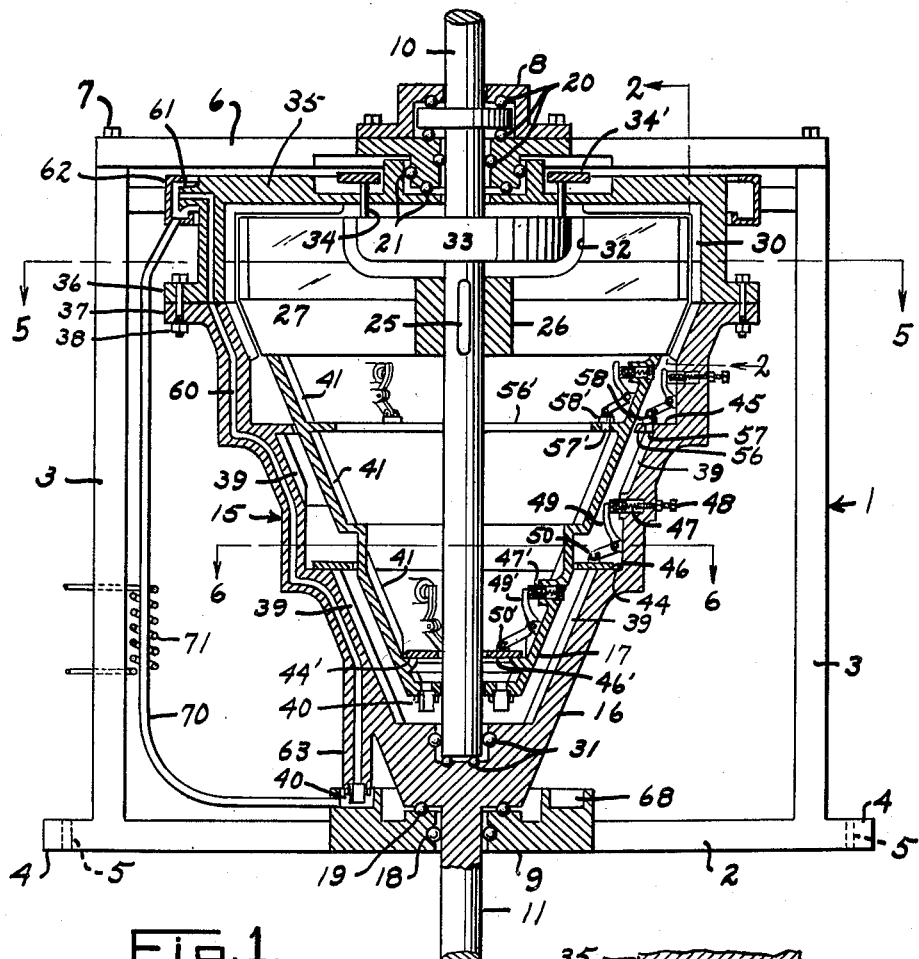
Fig. 1 is a vertical sectional view through one embodiment of the invention.
Figure 5:
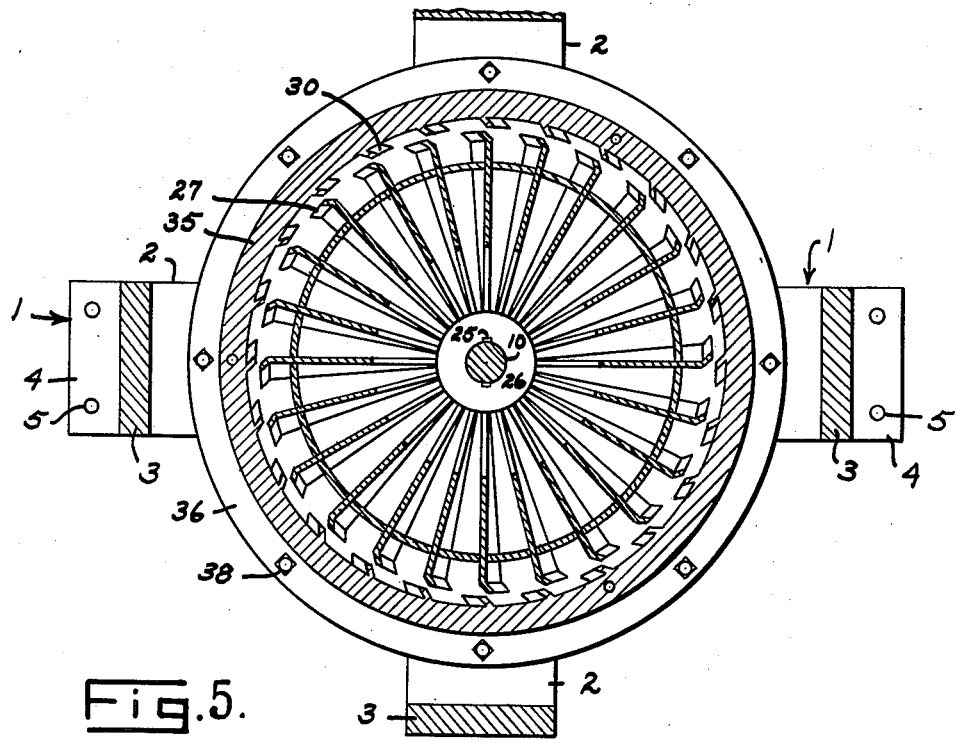
Figure 6:
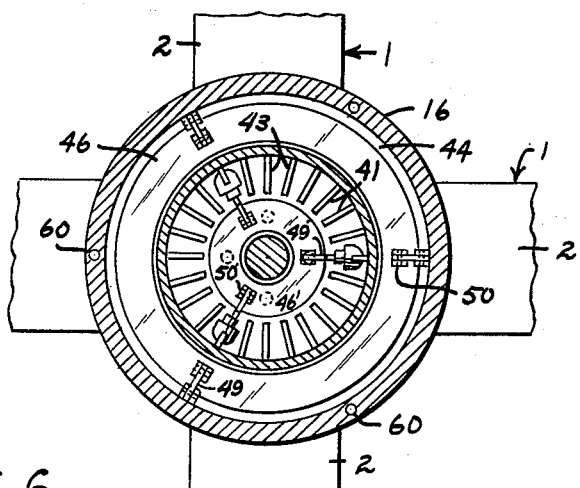
Figure 7:
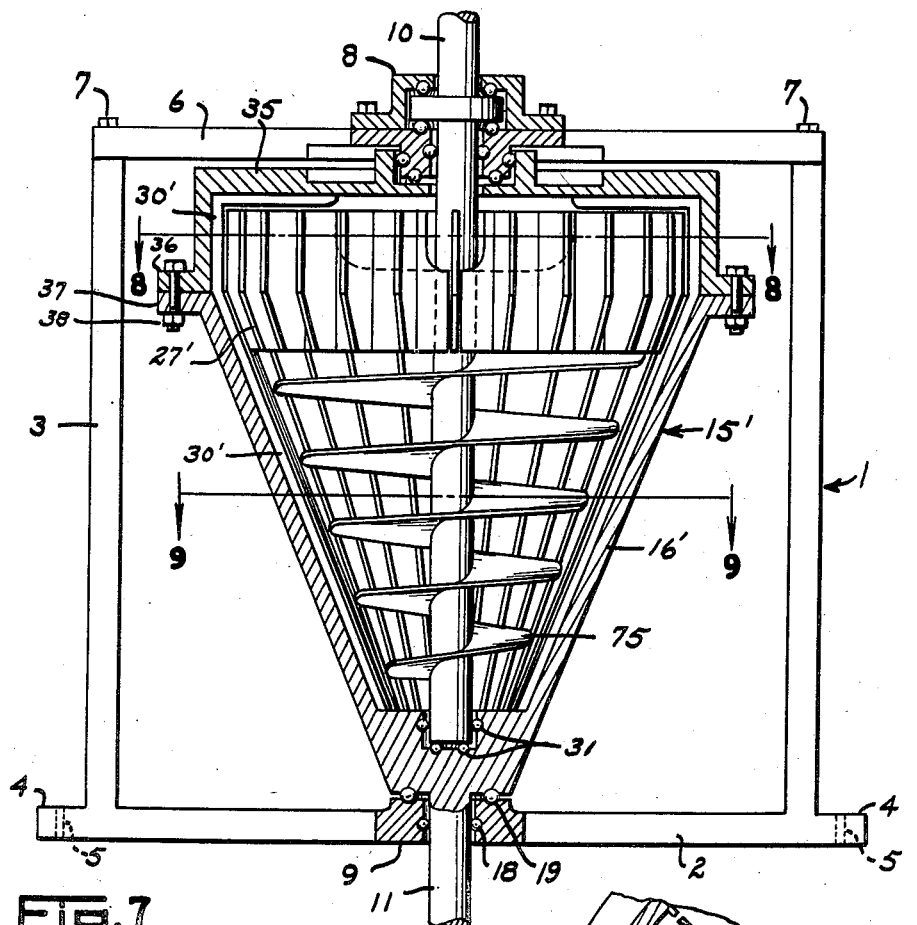
Figure 9:
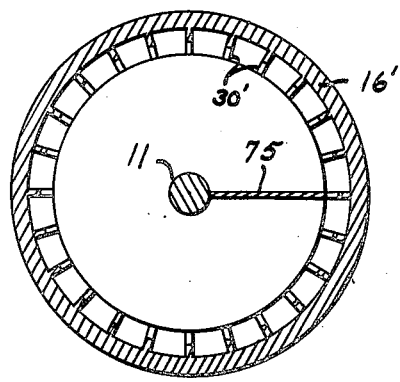
Figure 8:
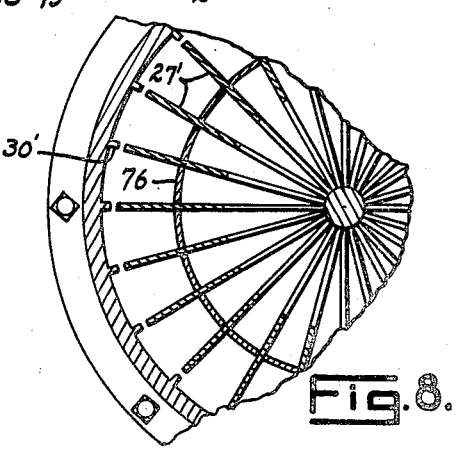
Figure 10:
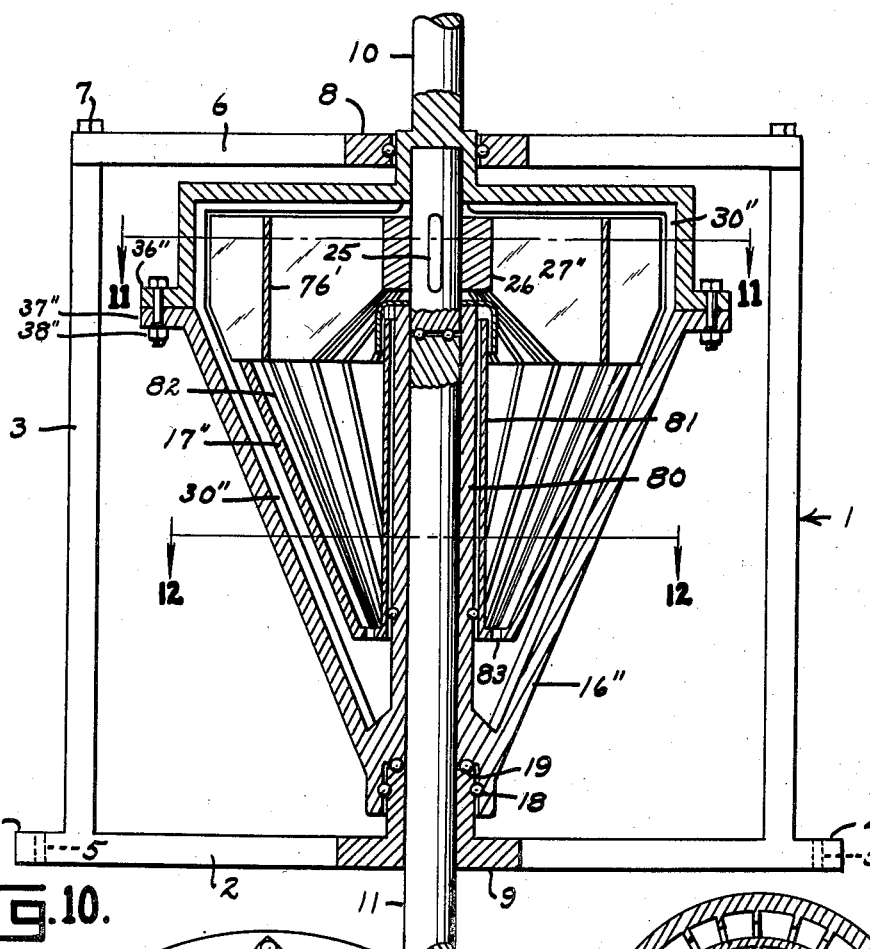
Figure 11:
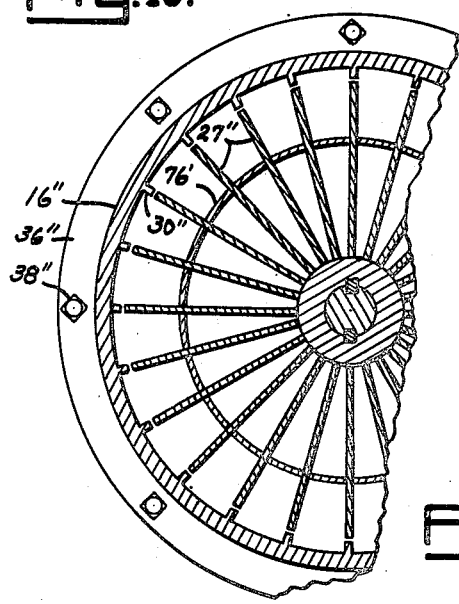
Figure 12:
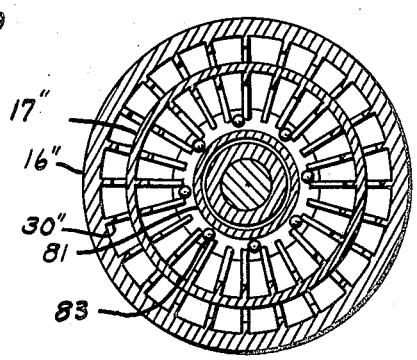

Figs. 5 and 6 are horizontal sectional views in Fig. 1 taken on lines 5—5 and 6—6, respectively;

Fig. 7 is a view similar to that shown in Fig. 1 and illustrates an alternative embodiment;

Figs. 8 and 9 are horizontal sectional views taken on lines 8—8 and 9—9, respectively, of Fig. 7;

Fig. 10 is a vertical sectional view of still another embodiment of the invention; and Figs. 11 and 12 are sectional views taken on lines 11—11 and 12—12, respectively, of Fig. 10.

Each of the embodiments shown in the drawings includes an open framework, 1 comprising a base 2 and pillars 3 arranged about a common axis. The base 2 is provided with ears 4 having openings 5 therein to receive fastening means such as bolts to secure the device in operating position. The top of the frame 1 is closed by intersecting arms 6 which are secured to the pillars 3 by cap screws 7 after the rotating assembly 15 is positioned within the framework. The centers of the top and bottom of the framework 1 are provided with bearing assemblies 8 and 9 to rotatably support the assembly 15, which includes drive shaft 10 and driven shaft 11.

Attention is here directed to the fact that either the shaft 10 or the shaft 11 may be used as the drive shaft, and the specific designation just used is not intended to require in a given instance that the shaft 10 shall be the drive shaft or that the shaft 11 shall be the driven shaft.

Referring to the embodiment shown in Figs. 1 to 6, inclusive, the assembly 15 includes nested conical outer and inner members 16 and 17, which are respectively attached to the shafts 11 and 10 and which have their bases uppermost. The member 16 and associated shaft 11 are journaled in anti-friction bearing 18 in the bearing housing 9, and the thrust of the assembly is borne by the bearing 19 in this housing.

The shaft 10 is secured by keys 25 to a boss 26, which is in turn attached to the member 17 through vanes 27, to which further reference will be made. This shaft extends downwardly through an opening at the lower end of the member 17 and rotates in and upon journal and thrust bearings 31 within a recess in the bottom of the outer member 16. At the frame 1 this shaft is provided with suitable anti-friction bearings indicated at 20.

It is intended that a single liquid, or a plurality of liquids having different specific gravities, shall be contained within the enclosure of the assembly 15. The term "Liquid" as used herein contemplates either a single liquid or a plurality of liquids used in accordance with the invention to obtain the desired operating characteristic of the transmission to satisfy requirements. It is also contemplated that comminuted materials may be used in the liquid to provide desired specific gravities, such materials being held in suspension as a part of the transmission liquid.

Normally, the body of liquid will occupy the bottom of the enclosure under the influence of gravity. If, however, either of the members 16 or 17 is caused to rotate, the liquid will be subjected to centrifugal force, and hence tends to move outwardly and upwardly to a position where the radius of rotation is maximum.

Figure 2:
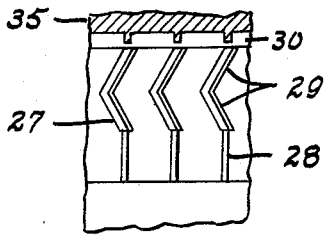
Fig. 2 is a vertical sectional view taken on line 2—2 in Fig. 1.

As above indicated, the boss 26 is secured to the vanes 27, which constitute a part of the inner member 17. These vanes extend radially of the shaft 18, and in this embodiment are of the configuration which is best seen in Fig. 2. The lower portion 28 of each vane lies in a plane which passes through the axis of the shaft 18. The adjacent and upper portion of each vane comprises offset portions 29 whereby there is formed a cupped vane construction designed to enhance the transmission of torque from the drive to the driven members of the transmission.

Co-operating with the vanes 27 and having a similar configuration are the vanes 30 on the interior of the member 16 and at the upper end thereof. The vanes 27 and 30 are, therefore, positioned in opposed and closely spaced relation within the upper end of the assembly 15.

To facilitate the assembly of the rotatable unit 15, the top 35 of the outer member 16 is a unitary cap construction having a peripheral flange 36. When the inner member 17 is in place, as indicated in Fig. 1, the flange 36 engages a complementary flange 37 and the component portions of the member 16 are then secured together by means of bolts 38. Journal and thrust bearings 21 between the member 35 and 8 provide precision alinement of the upper end of the member 16 and the associated elements.

The mode of operation of the structure thus far described is believed apparent. By way of further description and a summary of the operation, it will be pointed out that additional vanes 39 are also provided within the member 16 while similar vanes 41 are provided in the member 17 so that the tendency to create centrifugal force within the fluid is enhanced. As already indicated, rotation of either of these members causes the transmission fluid or fluids to move outwardly and upwardly, and it seems apparent that the entry of such fluids into the space occupied by the vanes 27 and 30 will create a fluid transmission of torque between the drive and the driven members 16 and 17.

If a single fluid is used within the enclosure in and about the member 17, this transmission of torque will increase with the speed of rotation as the liquid rises among these driving vanes, and such transmission will approach an interlock between the members at high speed. If, on the other hand, it is desired to have a modified change in the torque transmission, immiscible liquids having different viscosities and different specific gravities may be placed within the enclosure. The lighter of these liquids will assume an uppermost position and will be moved outwardly and upwardly under centrifugal force to effect initial coupling between the drive and driven members. As the speed of rotation of the assembly 15 increases, however, such lighter liquid will be displaced inwardly toward the center of rotation by the heavier liquid, whereby a modified coupling action will be given at the higher speeds. By utilizing proportioned amounts of selected transmission fluids, various operating characteristics of the transmission may be obtained.

Ingress and egress of liquid to and from the interior of the inner member 17 is provided by diverters 40 in openings in the bottom of this member. These diverters are of the same construction as those used in the temperature control system shown in detail in Fig. 3 and will be more fully described hereinafter.

In order to provide a positive interlock between the members 16 and 17, the vanes 27 are cut away at 32 to provide space for a clutch mechanism 33 mounted on shaft 18 and having actuating pins 34 engaged by a clutch operating ring 34', which may be moved in a vertical direction by suitable means (not shown) to effect desired clutching and declutching operations.

The foregoing description of the operation of the device assumes that the transmission fluid within the assembly 15 is free to move outwardly and upwardly under centrifugal force created by the rotation of either or both of the assembly members 17 and 16. In order to provide suitable control of the fluid movement whereby the transmission of torque can be controlled in a predetermined manner, damper or valve mechanisms are provided. To provide this feature, the inner surface of the members 16 and 17 are stepped internally at one or more points to provide surfaces such as 44, 45 and 44'.

A damper or valving ring 46 seats upon the surface 44 and is urged downwardly by means of compression springs 47, of which the tension is adjustable by means of tensioning screws 48. The inner ends of these springs engage the upper arm of a bell crank lever 49, and the other arm of such lever is operatively connected to the ring 46 at 50. A similar structure is provided within the member 17 and like parts are identified by primed reference characters.

At the stepped surface 45 in the member 16, where centrifugal force is greater, an inwardly extending flange 56 is provided, there being a plurality of vertical openings 57 through this flange. These openings are normally closed by valve members 58, which are urged into sealing position by a spring and lever construction of the type just described in connection with the operation of rings 46 and 46'. At or proximate this level the inner member 17 also has an inwardly extending flange 56' provided with openings 57' controlled by a valve 58' by a mechanism such as that just described for valve 58.

The operation as above set forth is modified by the damping structures, just described, only by the controlled rate at which fluid is admitted from the lower portions of the enclosure 31 to the vanes 27 and 30 by the spring loaded damping valves 46, 46', 58 and 58'.

Figure 3:
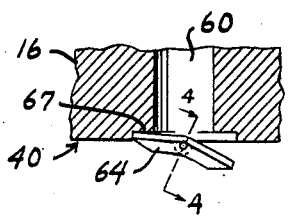
Fig. 3 is a sectional detail of the fluid diverter of the temperature control means constituting an element of the device.
Figure 4:
Fig. 4 is a sectional view taken on line 4—4 in Fig. 3.

The walls of the outer member 16 are provided with a plurality of vertical passages 60. These passages terminate at their upper ends in projections 61 on the cap 35 and these projections enter an annular chamber in a fluid collecting ring 62 mounted in the frame 1. The lower ends of these passages terminate in projections 63, each of which is provided with the diverter assembly 40 comprising diverter 64, tiltable upon pivots 65, as best seen in Figs. 3 and 4. The structure of the diverter 64 is such that its center of gravity is below the pivots 65 and hence the passage 60 opens at both sides of the diverter. It is to be noted that the diverters 64 dip into an annular groove 68 in the bearing housing 9, and that such groove communicates through a heat exchange member 70 with the interior of the fluid collector ring 62. A coil 71 surrounds the member 70 and is adapted to provide circulation of a fluid by means of which heat may be supplied to or abstracted from the member 70, to effect desired temperature control of a fluid passing through the latter.

When the assembly 15 is caused to rotate, the diverters tilt so that the forward ends, in the direction of rotation, move downwardly while the opposite ends of the diverters engage the seating surface 67. In this manner a temperature control fluid within the annular space 68 is scooped up by the diverters to enter the passages 60. This fluid then moves upwardly under centrifugal force exerted thereon and is discharged through the openings in the projections 61 into the annular chamber or collecting ring 62. This fluid returns to the space 68 by way of the heat exchange member in which such heating or cooling of the liquid is effected as is necessary to maintain the desired temperature condition within the assembly 15.

The diverters 40 at the bottom of the inner member 17 operate in the manner just described and serve to provide a proper amount of liquid to the interior of the member.

The embodiment shown in Fig. 7, similar to that above described, comprises opposed vanes 27' and 30' on the inner and outer rotating members, respectively. Inasmuch as damper means is not provided in this embodiment as shown in the drawings, the vanes 30' extend downwardly along the inner tapered walls of the member 16'. The lower portion of the inner member of this embodiment comprises a tapered, spiral fluid elevator 75, which supplements centrifugal force to lift the transmission fluid within the outer member 16'. This spiral element serves to move fluid upwardly and to discharge the fluid outwardly for engagement with the portion of the vanes 30' extending downwardly along the inner walls of the member 16'. This embodiment of the invention is of particular utility where rotation in a given direction and a predetermined characteristic of driving torque are required.

This characteristic is also modified by the provision of an annular baffle 76 (Fig. 8) between the fins 27' and at a predetermined distance from the outer ends of these fins. Because of limited clearance of relatively movable parts this baffle serves to control the rate at which radial movement of transmission fluid takes place during acceleration in rotational speed of the assembly 15'.

The outer member 16'' of the embodiment shown in Figs. 10, 11 and 12 is similar to that of the preceding embodiment, except that an internal upwardly extending sleeve 80 surrounds the shaft 11 and is adapted to receive a complementary sleeve 81 in the member 17'', which is provided with internal vanes 82. Openings 83 in the bottom of the inner member 17'' permit movement of transmission fluid to and from the interior of such member, and these openings may or may not, as desired, be provided with diverters 40 as shown in Fig. 1. Rotation of either of the members 16'' and 17'' causes movement of fluid upwardly and outwardly along the fins or vanes 30'', 82 or both to the space within which the fins 30'' and 27'' are in closely opposed relation. The rate at which this fluid moves radially inwardly along the fins 27'' is controlled by a barrier 76' in the manner of the previously described embodiment of Figs. 7, 8 and 9.

Broadly, the invention comprehends a transmission device having a wide range of transmission characteristics, whereby such transmission may be readily adapted to satisfy a wide range of requirements and conditions.

The invention claimed is:

1. A transmission comprising an assembly including upwardly diverging nested driving and driven members forming an enclosure within the assembly, opposed driving vanes on said members proximate the upper peripheral portions thereof, a body of transmission fluid within the enclosure for movement by centrifugal force to enter said vanes and effect a driving connection between the members, a radially extending annular barrier in at least one of said members, and valving means operable by centrifugal force exerted thereon by said liquid to form a by-pass and control the rate of movement of transmission fluid upwardly past said barrier to said driving vanes.

2. A transmission comprising an assembly including upwardly diverging nested driving and driven members forming an enclosure within the assembly, opposed driving vanes on said members proximate the upper peripheral portions thereof, a body of transmission fluid within the enclosure for movement by centrifugal force to enter said vanes and effect a driving connection between the members, a radially extending annular barrier in at least one of said members, means for controlling the rate of movement of transmission fluid upwardly past said barrier to said driving vanes, and additional means in the bottom of the inner member for controlling the rate of flow of fluid into and from the interior of said inner member.

3. A transmission comprising an assembly including upwardly diverging nested driving and driven members forming an enclosure within the assembly, opposed driving vanes on said members proximate the upper peripheral portions thereof, a body of transmission fluid within the enclosure for movement by centrifugal force to enter said vanes and effect a driving connection between the members, means for controlling the temperature of said assembly, said last mentioned means comprising a stationary heat exchange unit, there being heat exchange ducts in at least one of said nested members, and means operable by rotation of the assembly for circulating fluid through the ducts from the unit.

4. A transmission comprising an assembly including nested driving and driven members, means forming a torque transmitting fluid connection between said members, a heat exchanger, a plurality of fluid passages in one of said members and means operable by rotation of said member to transmit fluid from and to the heat exchanger through said passages.

5. In a device of the class described the combination comprising, a pair of nested conical transmission members forming an enclosure, a transmission fluid therein there being a passage for the transmission fluid from the inner transmission member to the outer transmission member proximate the upper ends thereof, a peripheral seat in at least one of said members, valving means engaging said seat and operable by a predetermined pressure thereon to admit fluid from the smaller to the larger ends of the members, and means at the larger ends of the members to form a torque transmitting fluid connection from the fluid admitted thereto by said valving means.

CARL J. JENDRESEN.

REFERENCES CITED

The following references are of record in the file of this patent:

UNITED STATES PATENTS

| Number | Name | Date |
|---|---|---|
| 1,007,266 | Burrell | Oct. 31, 1911 |
| 1,750,969 | Schafran | Mar. 18, 1930 |
| 1,914,618 | Rudqvist | June 20, 1933 |
| 1,935,400 | Junkers | Nov. 14, 1933 |
| 1,940,918 | Petroni et al. | Dec. 26, 1933 |
| 2,088,818 | Skinner | Aug. 3, 1937 |
| 2,166,961 | Marsh | July 25, 1939 |
| 2,214,416 | Haltz | Sept. 10, 1940 |
| 2,360,710 | Nutt et al. | Oct. 17, 1944 |

FOREIGN PATENTS

| Number | Country | Date |
|---|---|---|
| 588,678 | Germany | Dec. 7, 1933 |